United States Patent [19]

Ikuta et al.

[11] Patent Number: 5,296,851
[45] Date of Patent: Mar. 22, 1994

[54] SIGNAL COMMUNICATION SYSTEM

[75] Inventors: Yoshihisa Ikuta, Toyonaka; Yoshiaki Yanagida, Hirakata; Hisaki Shimosaka, Neyagawa, all of Japan

[73] Assignee: Mita Industrial Co., Ltd., Osaka, Japan

[21] Appl. No.: 710,739

[22] Filed: Jun. 3, 1991

[30] Foreign Application Priority Data

| Jun. 8, 1990 | [JP] | Japan | 2-151331 |
| Aug. 23, 1990 | [JP] | Japan | 2-224080 |
| Aug. 23, 1990 | [JP] | Japan | 2-224081 |
| Aug. 23, 1990 | [JP] | Japan | 2-224082 |

[51] Int. Cl.⁵ .............................................. H01Q 1/00
[52] U.S. Cl. .......................... 340/825.07; 340/825.14
[58] Field of Search .................... 340/825.07, 825.14, 340/825.44, 825.52

[56] References Cited

U.S. PATENT DOCUMENTS

| 3,764,742 | 10/1973 | Abbott et al. | 340/825.52 |
| 4,637,022 | 1/1987 | Burke et al. | 340/825.07 |
| 4,684,941 | 8/1987 | Smith et al. | 340/825.44 |
| 4,803,487 | 2/1989 | Willard et al. | 340/825.44 |
| 4,804,954 | 2/1989 | Macnak et al. | 340/825.44 |
| 4,866,421 | 9/1989 | Szczepanek | 340/825.52 |

Primary Examiner—Donald J. Yusko
Assistant Examiner—Brian Zimmerman
Attorney, Agent, or Firm—Jordan and Hamburg

[57] ABSTRACT

A signal communication system includes a control portion and an operation portion. The control portion has an output data transmitter for transmitting output data to the operation portion in the form of a serial signal, and an input data receiver for receiving input data signal from the operation portion. The operation portion has an input data transmitter for transmitting the input data to the control portion in the form of a serial signal, and an output data receiver for receiving the output data from the control signal, and an operable device for executing an operation in accordance with the output data. The control portion further has an output data memory for storing output data, a timing signal generator for generating a timing signal, and a timing signal transmitter for transmitting the timing signal to the output data transmitter and the operable device. Thereby, the output data transmitter transmits the output data in accordance with the timing signal and the operable device the operation in synchronization with the timing signal.

5 Claims, 13 Drawing Sheets

SIGNAL COMMUNICATION SYSTEM

FIELD OF THE INVENTION

This invention relates to a signal communication system.

BACKGROUND OF THE INVENTION

A copying machine, facsimile transmitter machine or the like is provided with a console panel having an inputting portion and a display portion. The console panel communicates with a main controller provided in a main body of the machine. There have been two communication techniques. One is a static communication technique and the other a dynamic scan communication technique.

In the static communication technique, the number of control lines are required which corresponds to the number of display elements or inputting keys, which consequently involves cumbersome wiring and needs an increased number of connectors.

In the dynamic scan communication technique, on the other hand, the inputting portion and the display portion of the console panel are connected to the main controller in the form of a matrix. A scan address and display data are transmitted to the display portion in which display elements are in turn driven in accordance with the transmitted scan address and display data to provide a dynamic display. Also, key data is transmitted to the main controller from the operation portion.

Accordingly, it will be seen that the dynamic scan communication technique needs smaller number of control lines than the static communication technique. However, in case the number of display elements or inputting keys increases, the number of control lines will increase. Consequently, wiring becomes cumbersome and an increased number of connectors are required. Moreover, the main controller needs more complicated program.

Japanese Unexamined Patent Publication No. 60-101561 has proposed a signal communication system in which a CPU is provided in an operating portion to execute nonsynchronous serial communication between the operating portion and a main controller. Specifically, only when display data is changed, the changed data is transmitted from a CPU in the main controller to the CPU in the operating portion in serial form, and stored in the CPU in the operating portion, and then displayed on a display portion. However, there is a likelihood that if the transmitting signal is distorted to an wrong signal by noise or the like in the transmission, the wrong signal is stored in the CPU, and displayed on the display portion. To prevent the above wrong display, the CPU of the operating portion executes the detection of wrong data, and transmits to the CPU of the main controller a signal requesting the re-transmission of display data when wrong data is detected.

However, the signal communication system of Japanese Unexamined Patent Publication No. 60-101561 has the following drawbacks: The request of re-transmission makes the signal processing more complicated, and also makes signal processing time longer. The provision of the CPU in the operating portion needs a program for the CPU of the operating portion, and increases the costs of production.

Also, in the dynamic scan communication technique, data is transmitted in a fixed order between the main controller and the operating portion. Accordingly, data having the same address is transmitted in the same cycle. If the power source, clock signal generator, or external unit generate a noise in synchronization with the transmitting signal, the noise will continuously damage data in a particular address. Consequently, a particular area of the display portion continuously provides a wrong display, or input of a particular key is continuously wrongly transmitted to the main controller.

There has been a signal communication system provided with CPUs in a main controller and an operating portion respectively, the CPUs checking every frame whether or not a received signal has an error. Specifically, the CPU of the operating portion executes checking of the received signal every one frame, e.g., 24 bits, and transmits an error flag data representing the detection result in the form of one bit to the CPU of the main controller. Similarly, the CPU of the main controller executes checking of a signal transmitted from the operating portion every one frame, and also confirms the error flag data from the operating portion. When it is detected based on the error flag data that the signal received by operating portion has no error, the CPU of the main controller transmits a next new signal to the operating portion. If it is detected that the signal received by the operating portion has an error, the CPU of the main controller transmits the previously transmitted signal to the operating portion again.

However, the CPU of the main controller executes the checking of a signal from the operating portion every frame. Even if the received signal has no more than one bit error, all the data in the checked frame are determined to be invalid. Accordingly, the checked frame including the error flag data is not received by the CPU of the main controller. Consequently, the CPU of the main controller does not transmit the previously transmitted signal again, which has been requested by the operating portion, but transmits a next new signal to the operating portion.

After receiving the error flag data, the CPU of the main controller determines whether it is necessary to transmit the previously transmitted signal is transmitted to the CPU of the operating portion again. Accordingly, a prolonged time is consumed for the signal communication, which consequently involves light flickerings in the display, and slow response in key inputting. Further, it will be seen that the more display elements and keys are provided, the more often the flickering and slow response will occur.

In view of the above-mentioned drawbacks, it is an object of the present invention to provide a signal communication system which is simpler in construction, and can ensure smaller number of communication error and higher communication speed.

SUMMARY OF THE INVENTION

Accordingly, a signal communication system of the present invention comprises a control portion and an operation portion, the control portion including output data transmitting means for transmitting output data to the operation portion in the form of a serial signal, and input data receiving means for receiving input data signal from the operation portion, and the operation portion including input data transmitting means for transmitting the input data to the control portion in the form of a serial signal, output data receiving means for receiving the output data from the control signal, and operable means for executing an operation in accordance with the output data.

In this construction, output data and input data are transmitted in the form of serial signals. Accordingly, the number of control lines and connectors can be greatly reduced, thus ensuring easier wiring.

Also, according to the present invention, the control portion further includes output data memory means for storing output data. a timing signal generator for generating a timing signal, and a timing signal transmitter for transmitting the timing signal to the output data transmitting means and the operable means, the output data transmitting means transmitting the output data in accordance with the timing signal and the operable means executing the operation in synchronization with the timing signal.

In this construction, in synchronization with the timing signal, the output data transmitting means transmits the output data and the operable means executes the operation. Accordingly, a CPU or controller is not necessary to be provided in the operation portion, consequently providing a simpler construction and programming. Thus, the costs can be considerably reduced.

According to the present invention, the control portion further includes data memory means for storing output data and input data, data renewing means for renewing the input data previously stored in the data memory means with a new input data received by the input data receiving means, a timing signal generator for generating a timing signal, a timing signal transmitter for transmitting the timing signal to the output data transmitting means and the operable means, the output data transmitting means transmiting the output data in synchronization with the timing signal, the input data transmitting means transmitting the input data in synchronization with the timing signal, and the operable means executing the operation in synchronization with the timing signal.

In this construction, in synchronization with the timing signal, the output data transmitting means transmits the output data, the input data transmitting means transmits the input data, the data renewing means renews the input data, and the operable means executes the operation. Accordingly, it is not necessary to provide a CPU or controller in the operation portion, consequently providing a simpler construction and eliminating programming for CPU to be provided in the operation. Thus, the costs can be considerably reduced.

According to the present invention, further, the operable means includes an operation element corresponding to output data, and designating means for designating an operation element corresponding to the received output data.

In this construction, operation elements corresponding to the received output data are designated in the operation portion. Accordingly, the control portion can be simplified. The programming for the control portion can be made more easily.

According to the present invention, moreover, the operation portion further includes error data adding means for adding error data indicating that a reception error has occured in the output data receiving means to the input data, and the control portion further includes error data discriminating means for discriminating the presence of error data, and prohibition means responsive to the error data discriminating means for prohibiting the renewing of the data memory means with the new input data.

In this construction, if an error has occured in the reception of input data, the input data is prohibited from storing in the data memory means. Accordingly, the influence of noise can be eliminated, with the result that erroneous input data is prevented from being stored.

According to the present invention, the control portion further includes an address generator for generating address data, address data adding means for adding the address data to output data, and the operable means includes an operation element corresponding to output data, and designating means for designating an operation element corresponding to the received output data based the address data added to the received output data.

In this construction, an operation element corresponding to the received output data is designated based on the address data added to the received output data. Accordingly, the operation portion can be given a simpler construction.

According to the present invention, the control portion further includes output data memory means for storing output data, a timing signal generator for generating a timing signal, a timing signal transmitter for transmitting the timing signal to the output data transmitting means and the operable means, whereby the output data transmitting means transmitting the output data in synchronization with the timing signal, and the operable means executing the operation in synchronization with the timing signal, and the operable means including an operation element corresponding to output data, and designating means for designating an operation element corresponding to the received output data.

In this construction, in synchronization with the timing signal, the output data transmitting means transmits the output data, and the operable means executes an operation element corresponding to the received output data. Accordingly, the construction of the control portion can be simplified. The programming for the control portion can be made with ease.

According to the present invention, the control portion further includes output data memory means for storing output data, an address generator for generating address data, address data adding means for adding the address data to output data, a timing signal generator for generating a timing signal, a timing signal transmitter for transmitting the timing signal to the output data transmitting means and the operable means, whereby the output data transmitting means transmitting the output data in synchronization with the timing signal, the operable means executing the operation in synchronization with the timing signal, the operable means including an operation element corresponding to output data, and designating means for designating an operation element corresponding to the received output data based on the address data added to the received output data.

In this construction, the output data transmitting means transmits the output data, and the operable means executes the operation in synchronization with the timing signal. The execution of operation element corresponding to the received output data is performed based on the address data added to the received output data. Accordingly, the operation portion can be given a simpler construction.

According to the present invention, the control portion further includes output data memory means for storing output data, error detection data adding means for adding error detection data to output data to be transmitted, a timing signal generator for generating a timing signal, a timing signal transmitter for transmitting the timing signal to the output data transmitting means and the operable means, the output data transmitting means transmitting the output data in synchronization with the timing signal, and the operable means executing the operation in synchronization with the timing signal, and the operation portion including error detection means for detecting based on the error detection data whether a reception error has occured in the output data transmission, and prohibition means responsive to the error detection means for prohibiting the execution of the operable means.

In this construction, the error detection means detects, based on the error detection data, whether a reception error has occured in the output data transmission. If a reception error has occured, the prohibition means prohibits the execution of the operable means. Accordingly, the influence of noise can be eliminated.

According to the present invention, the operation portion further includes designating means for designating an operation element corresponding to the received output data.

In this construction, the operation portion is provided with the designating means for designating the operation element corresponding to the received output data. Accordingly, the construction of the control portion can be simplified, and programming for the control portion can be made with more ease.

According to the present invention, the control portion further includes an address generator for generating address data, address data adding means for adding the address data to output data, the operable means including an operation element corresponding to output data, and designating means for designating an operation element corresponding to the received output data based on the address data added to the received output data.

In this construction, the operable means executes an operation element corresponding to the received output data based on the address data added to the received output data. Accordingly, the construction of the operation portion can be simplified.

According to the present invention, further, each of the output data transmitting mean and the input data transmitting means transmits a plurality of data in a predetermined sequence, and includes transmission sequence changing means for changing the transmission sequence of the plurality of data.

In this construction, the transmission data are transmitted in the predetermined sequence. The transmission sequence is changeable. Accordingly, transmission data corresponding to a particular address can be prevented from being damaged by a periodic noise. Thus, the influence of noise can be eliminated.

According to the present invention, further, each of the output data transmitting means and the input data transmitting means includes error data adding means for adding error data indicative of the presence of reception error to transmission data, each of the output data receiving means and the input data receiving means including error data discriminating means for discriminating the presence of error data, and the transmission sequence changing means responsive to the error data discriminating means for changing the transmission sequence when the error data is discriminated.

In this construction, if a reception error has occured, the transmission sequence changing means changes the transmission sequence. In other words, when a reception error has occured, data corresponding to a particular address is transmitted in a different cycle. Accordingly, even if noise having the same cycle as the transmission cycle of data occurs, transmission data corresponding to a particular address can be prevented from being damaged by the noise because the transmission cycle is changed. Thus, the influence of noise can be eliminated.

According to the present invention, further, the input data transmitting means includes error data adding means for adding error data indicative of the presence of reception error to input data to be transmitted, the input data receiving means including error data discriminating means for discriminating the presence of error data.

In this construction, the discrimination of error presence is executed based on the error data transmitted from the operation portion. Accordingly, the control portion can respond to the reception error in the operation portion more assuredly and promptly.

According to the present invention, further, the operation portion includes error data transmitting means for transmitting error data indicating that an error has occured in the reception of first output data, the transmission of the error data being executed when the output data transmitting means transmits second output data after the first output data, the control portion including data memory means for storing the first output data, error data receiving means for receiving the error data, error data discriminating means for discriminating the presence of error data, and transmission control means responsive to the error data discriminating means for controlling the output data transmitting means so as to transmit the first output data instead of the transmission of third output data after the second output data.

In this construction, if a reception error has occured, transmission control means causes the previous output data to be transmitted instead of the next new output data. Accordingly, output data can continuously be transmitted to the operation portion, providing a shorter transmission time. Also, the transmission cycle is changed. Accordingly, transmission data corresponding to a particular address can be prevented from being damaged by a periodical noise. Thus, the influence of noise can be eliminated.

It will be seen that these signal communication systems of the present invention are very useful for dynamic scan type signal communication systems The above and other objects, features and advantages of the present invention will become more apparent upon a reading of the following detailed description and the accompanying drawings.

DETAILED DESCRIPTION OF PREFERRED EMBODIMENTS OF THE INVENTION

Figure 1:
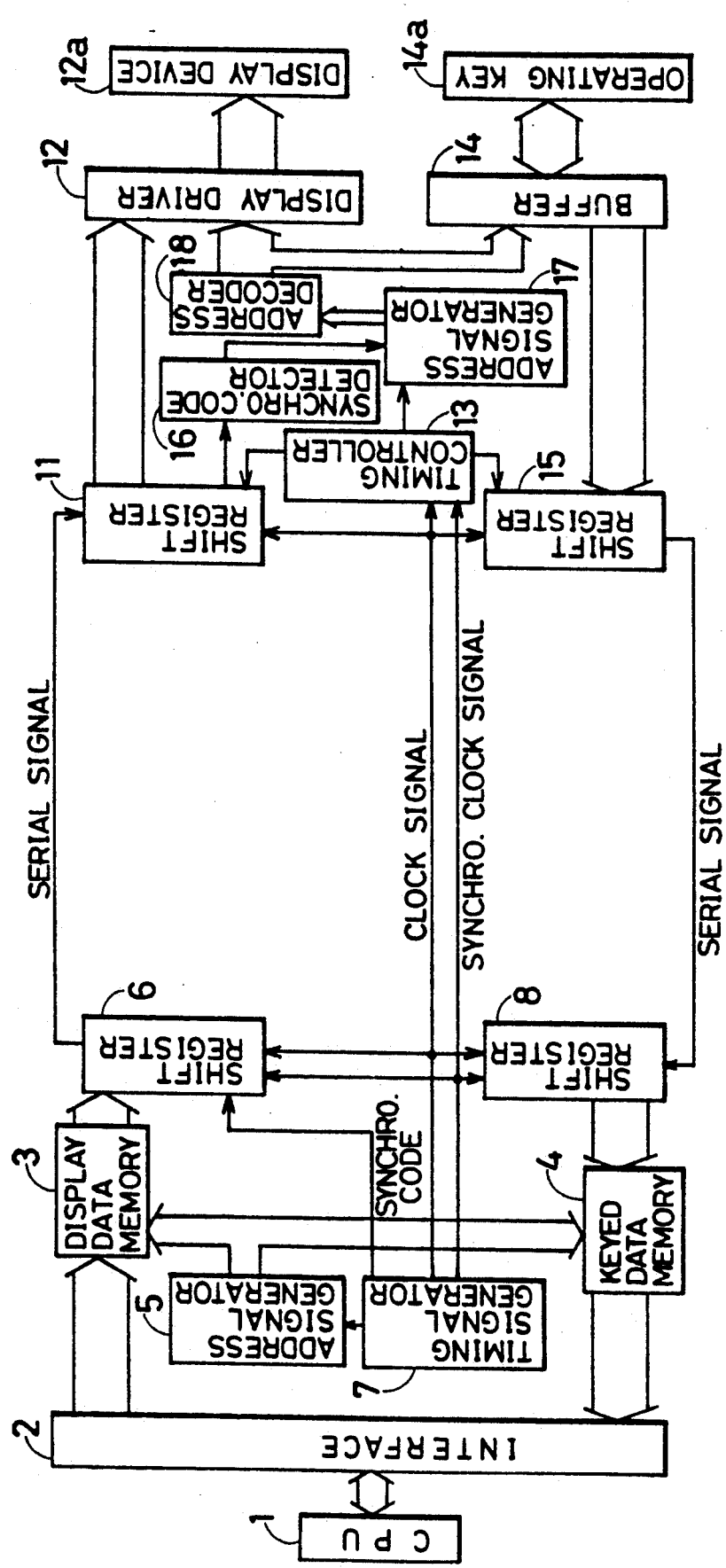
FIG. 1 is a block diagram showing an overall construction of a first signal communication system of the present invention for use in dynamic display of a copy machine.

FIG. 1 is a block diagram showing a first signal communication system of the present invention including a main control portion shown in the left side of the drawing, and an operating portion shown in the right side of the drawing. This signal communication system is used for dynamic display in a copying machine.

The main control portion has a CPU 1. The operating portion has a display device 12a and an operating key 14a. The CPU 1 is adapted for controlling operations of the system. An interface circuit 2 is adapted for transmitting display data from the CPU 1 to a display data memory 3 for storing the display data. Also, the interface circuit 2 is adapted for transmitting keyed data stored in a keyed data memory 4 to the CPU 1. The keyed data is inputted by way of keys. An address signal generator 5 is adapted for generating address signals which are to be used to store display data in the display data memory 3, to transfer display data from the display data memory 3 to a shift register 6 to be described later, and to store and read keyed data in and from the keyed data memory 4.

Further, in the main control portion is provided a timing signal generator 7 for generating a clock signal and synchronizing clock signal. These signals are transmitted to a timing controller 13 provided in the operating portion. Also, the clock signal is transmitted to the address signal generator 5 in which address signals are transmitted to the display data memory 3 and the keyed data memory 4 in accordance with the clock signal. Further, the clock signal and synchronizing clock signal are transmitted to the shift register 6 which in turn transmits in accordance with these signals a serial signal to a shift register 11. Also, the timing signal generator 7 generates and transmits a synchronizing code signal to the shift register 6. The shift register 6 transmits display data transferred from the display data memory 3 to the shift register 11 in serial form.

The keyed data is transmitted in serial form from a shift register 15 to a shift register 8. The shift register 8 receives and converts the keyed data from the serial form to a parallel form. The converted keyed data is transmitted to the keyed data memory 4 in which the keyed data is temporarily stored in accordance with address signals from the address signal generator 5, and then transmitted to the interface circuit 2 in accordance with address signals.

The shift register 11 receives the serial display data signal from the shift register 6, and converts the display data into a parallel signal in accordance with a synchronizing signal from the timing controller 13. The parallel display data is transmitted to a display driver 12.

The display driver 12 drives display elements provided in the display device 12a in accordance with scan address signals from an address decoder 18 so as to execute dynamic display of the display data. As the display elements are used a plurality of seven-segment units or LEDs.

The timing controller 13 generates the synchronizing signal based on the clock signal and the synchronizing clock signal from the timing signal generator 7. The synchronizing signal is transmitted to both shift registers 11 and 15, and an address signal generator 17. A synchronizing code detector 16 is adapted for detecting a synchronizing code from the display data from the shift register 11 and then transmits the synchronizing code to the the address signal generator 17. The address signal generator 17 generates scan address signals in accordance with the synchronizing signal and the synchronizing code signal. As mentioned above, the scan address signal is transmitted to the address decoder 18.

A buffer 14 for key input detects operation states of the inputting keys to produce keyed data which is transmitted to the shift register 15. The shift register 15 receives the keyed data from the buffer 14 and transmits the keyed data to the shift register 8 in the form of a serial keyed data signal in accordance with the synchronizing signal from the timing controller 13 and the clock signal from the timing signal generator 7.

Figure 2:
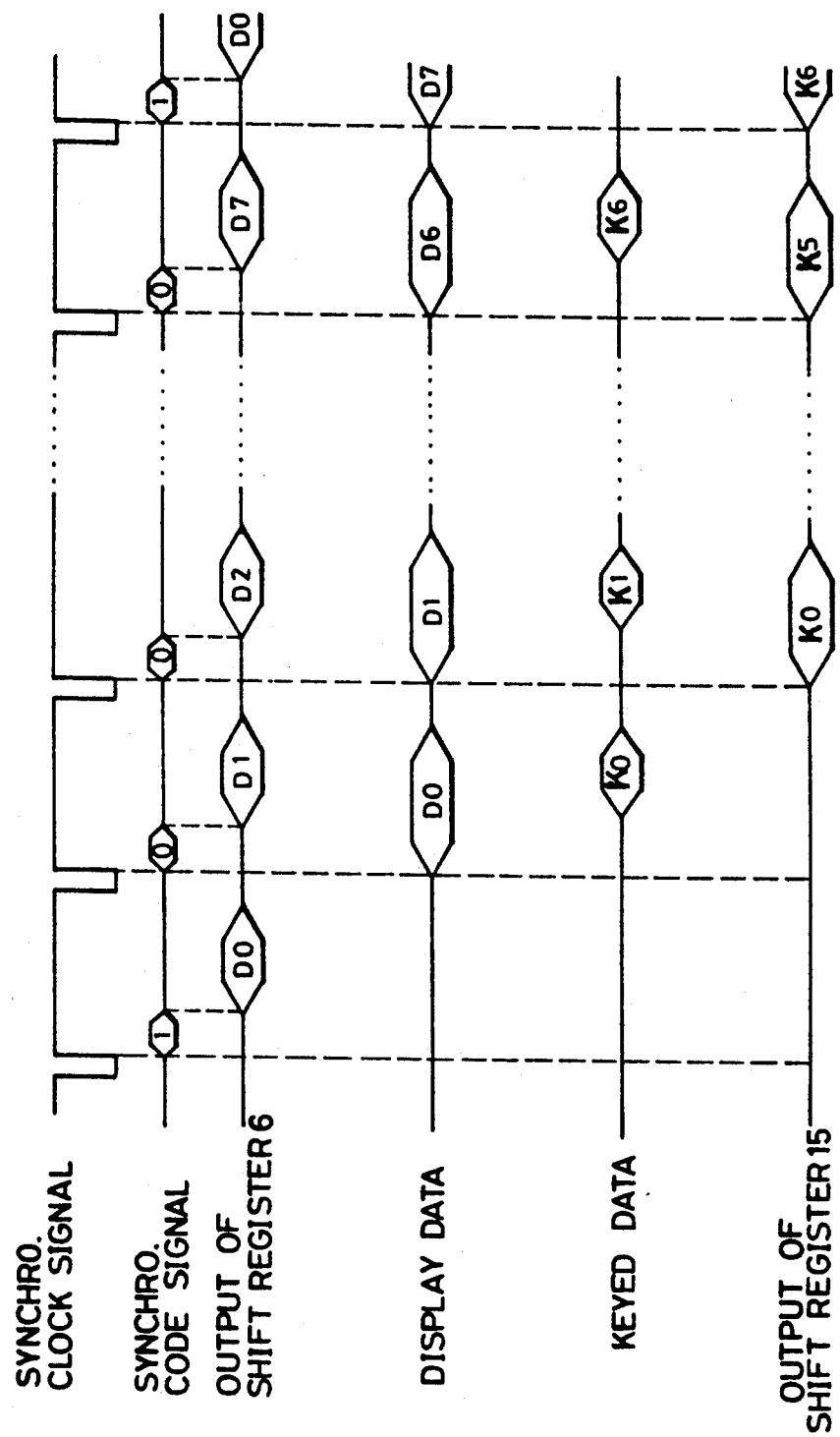
FIG. 2 is a diagram showing a relationship between signals generated in the first signal communication system.

Next, operations of this signal communication system will be described with reference to FIG. 2 in which D0 through D7 indicate display data respectively. The display data D0 to D7 are transmitted in sequence to the display device 12a to execute dynamic display. Each bit of the serial signal is transmitted in accordance with the clock signal. Each serial data signal is transmitted in accordance with the synchronizing clock signal. Further, the display data D0 is added with the synchronizing code "1". The display data D1 to D7 are added with the synchronizing code "0".

Specifically, the CPU 1 sequentially transmits the display data D0 to D7 to the display data memory 3 in which the display data D0 to D7 are then stored. On the other hand, the clock signal, synchronizing clock signal, synchronizing code signal are generated in the timing signal generator 7, and transmitted to the shift register 6. The shift register 6 receives and transmits the display data D0 to the shift register 11 in serial form while adding the synchronizing code "1" to the serial display data D0 in accordance with the synchronizing clock signal.

The shift register 11 receives the serial display data D0 and then transmits it to the display driver 12. The synchronizing code detector 16 detects the synchronizing code "1" and transmits it to the address signal generator 17. The address signal generator 17 generates an address signal for the display data D0 based on the synchronizing code "1". The display driver 12 drives display elements corresponding to the address signal to execute dynamic display of the display data D0.

Subsequently, the shift register 6 receives and transmits the display data D1 to the shift register 11 in serial form while adding the synchronizing code "0" to the serial display data D1 in accordance with the synchronizing clock signal. The shift register 11 receives the serial display data D1 and then transmits it to the display driver 12. The synchronizing code detector 16 detects the synchronizing code "0" and transmits it to the address signal generator 17. The address signal generator 17 generates an address signal for the display data D1 based on the synchronizing code "0". The display driver 12 drives display elements ? corresponding to the address signal to execute dynamic display of the display data D1.

Similarly, the display data D2 to D7 are, together with the synchronizing code "0", sequentially transmitted in the form of serial signals from the shift register 6 to the shift register 11. In the display device 12a, dynamic display of the display data D2 to D7 is executed by the use of display elements corresponding to respective addresses for the display data D2 to D7. These operations are repeated to maintain the dynamic display of the display data D0 to D7.

Next, operations of key input will be described. The buffer 14 detects the respective operation states of the inputting keys 14a and transmits keyed data to the shift register 15. The keyed data is transmitted to the shift register 8 in serial form in accordance with the synchronizing signal from the timing controller 13 and the clock signal from the timing signal generator 7.

The shift register 8 converts the received serial keyed data signal into a parallel keyed data signal in accordance with the clock signal and the synchronizing clock signal. The parallel keyed data signal is stored in the keyed data memory 4 in accordance with address signals from the address signal generator 5, and transmitted to the CPU 1 by way of the interface circuit 2.

The CPU 1 executes the processing corresponding to the keyed data. If it is necessary to renew the display data with a result of the processing, the CPU 1 transmits renewed display data to the display data memory 3 by way of the interface circuit 2. The renewed display data is transmitted to the display driver 12 in the above-mentioned way so as to execute dynamic display of the renewed display data in the display device 12a.

Figure 3:
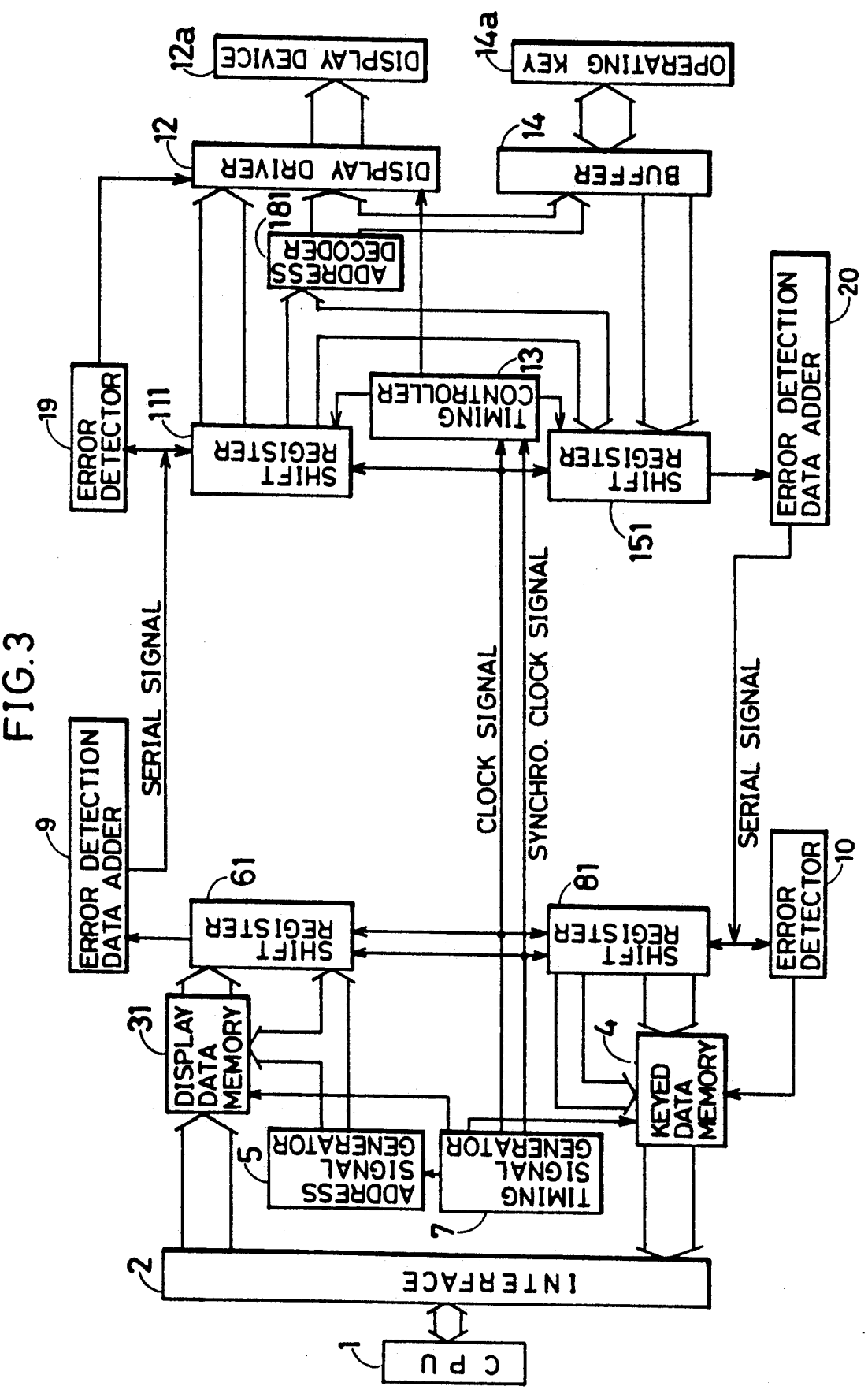
FIG. 3 is a block diagram showing an overall construction of a second signal communication system of the present invention.

A second signal communication system of the present invention will be described with reference to FIG. 3. It should be noted that in the drawings, like numerals denote like parts.

A display data memory 31 is adapted for storing display data, and adding scan address data to the display data to transmit it to a shift register 61. The shift register 61 transmits the display data added with the scan address data to a shift register 111 in serial form in accordance with a synchronizing clock signal from a timing signal generator 7.

A shift register 81 receives a serial keyed data signal from a shift register 151 and then converts the received serial data into a parallel signal to transmit it to a keyed data memory 4.

An error detection data adder 9 is provided in a main control portion to add error detection data to the serial display data signal from the shift register 61. Also, an error detector 10 is provided to discriminate whether the serial keyed data signal carries any error. The error detector 10 executes the discrimination by collating error detection data added to the serial keyed data signal with error detection data stored in the error detector 10. If the serial keyed data signal carries an error, the error detector 10 transmits a control signal to the keyed data memory 4 to prohibit the storing of the keyed data. For example, if error detection data added to the serial keyed data signal is changed due to noise, the error detector 10 collates the changed error detection data with the error detection data stored therein to detect a disagreement, consequently determining the received signal is wrong, and transmitting the control signal to the keyed data memory 4 to suspend the keyed data from being stored in the keyed data memory 4. As an example of the error detection data, it may be appropriate that a parity bit is added to a serial transmission signal, and the error detector 10 practices parity check.

The shift register 111 receives the serial display data signal from the shift register 61, and restores the serial display data to the parallel display data and scan address data in accordance with the clock signal and the synchronizing clock signal from the timing signal generator 7. An address decoder 181 receives the scan address data from the shift register 111 and informs the display driver 12 of necessary addresses. The display driver 12 drives display elements necessary to display the display data.

The shift register 151 receives keyed data from a buffer 14 and the scan address data from the shift register 111, and transmits the data in serial form in accordance with the synchronizing clock signal.

An error detector 19 is provided in the operation portion to discriminate whether the serial display data signal carries any error. The error detector 19 executes the discrimination by collating error detection data added to the serial display data signal with error detection data stored in the error detector 19. If the serial display data signal carries an error, the error detector 19 transmits a control signal to the display driver 12 to prohibit the display of the display data. For example, if error detection data added to the serial display data signal is changed due to a noise, the error detector 19 collates the changed error detection data with the error detection data stored therein to detect a disagreement, consequently determining the received signal is wrong, and transmitting the control signal to the display driver 12 to suspend the display data from being displayed in the display device 12a. It may be appropriate that a parity bit is added to the serial display data signal to enable the error detector 19 to practice parity check.

Next, operations of the second signal communication system will be described. The CPU 1 transmits display data D0 to the display data memory 31 in which the display data D0 is then stored. The shift register 61 receives and transmits the display data D0 to the shift register 111 in serial form while adding the scan address data to the serial display data D0 in accordance with the synchronizing clock signal. Further, the error detection data adder 9 addes error detection data to the serial display data signal D0.

The shift register 111 receives and restores the serial display data signal D0 to the original parallel display data D0 and the scan address data. The error detector 19 executes the collation of error detection data added to the serial display data signal D0 to the error detection data held in the error detector 19. When both of the error detection data come into agreement, the display driver 12 drives display elements in the display device based on the display data D0 and the scan address. On the other hand, if the both error detection data come into disagreement, the control signal is transmitted to the display driver 12 to suspend the display.

As mentioned above, if the error detector 19 detects an error, the display is suspended. However, the cycle of the dynamic display lasts for a few milliseconds. Accordingly, it will be seen that such suspension gives little influence to the afterimage effect, and thus will not cause unnatural display.

Next will be described operations of key input in the second signal communication system with reference to FIG. 2. The buffer 14 detects the respective operation states of the inputting keys 14a and transmits keyed data to the shift register 151. Further, the scan address data is transmitted to the shift register 151. The shift register 151 transmits the keyed data and the scan address data to the shift register 81 in serial form in accordance with the synchronizing clock signal from the timing controller 13 and the clock signal from the timing signal generator 7. The serial keyed data signal is added to error detection data by the error detection data adder 20.

The shift register 81 converts the received serial keyed data signal into the parallel keyed data signal and the scan address data in accordance with the clock signal and the synchronizing clock signal. The error detector 10 executes the collation of error detection data added to the serial keyed data signal to the error detection data held in the error detector 10. When both of the error detection data come into agreement, the keyed data is stored in the keyed data memory 4 in accordance with the scan address data. On the other hand, if both of the error detection data come into disagreement, the control signal is transmitted to the keyed data memory 4 to suspend the storing of the keyed data. As mentioned above, if the error detector 10 detects an error, the storing of keyed data having an error is suspended. However, the touching time of the key is considerably longer than the cycle of detecting the operating state of the key. Accordingly, it will be seen that such suspension gives little influence to the key detection. Correct keyed data can be transmitted to the CPU 1 by detection before and after the error detection.

It should be noted that such error detection data adders and error detectors may be provided in the first embodiment to suspend the storing of erroneous keyed data and display of erroneous display data.

Figure 4:
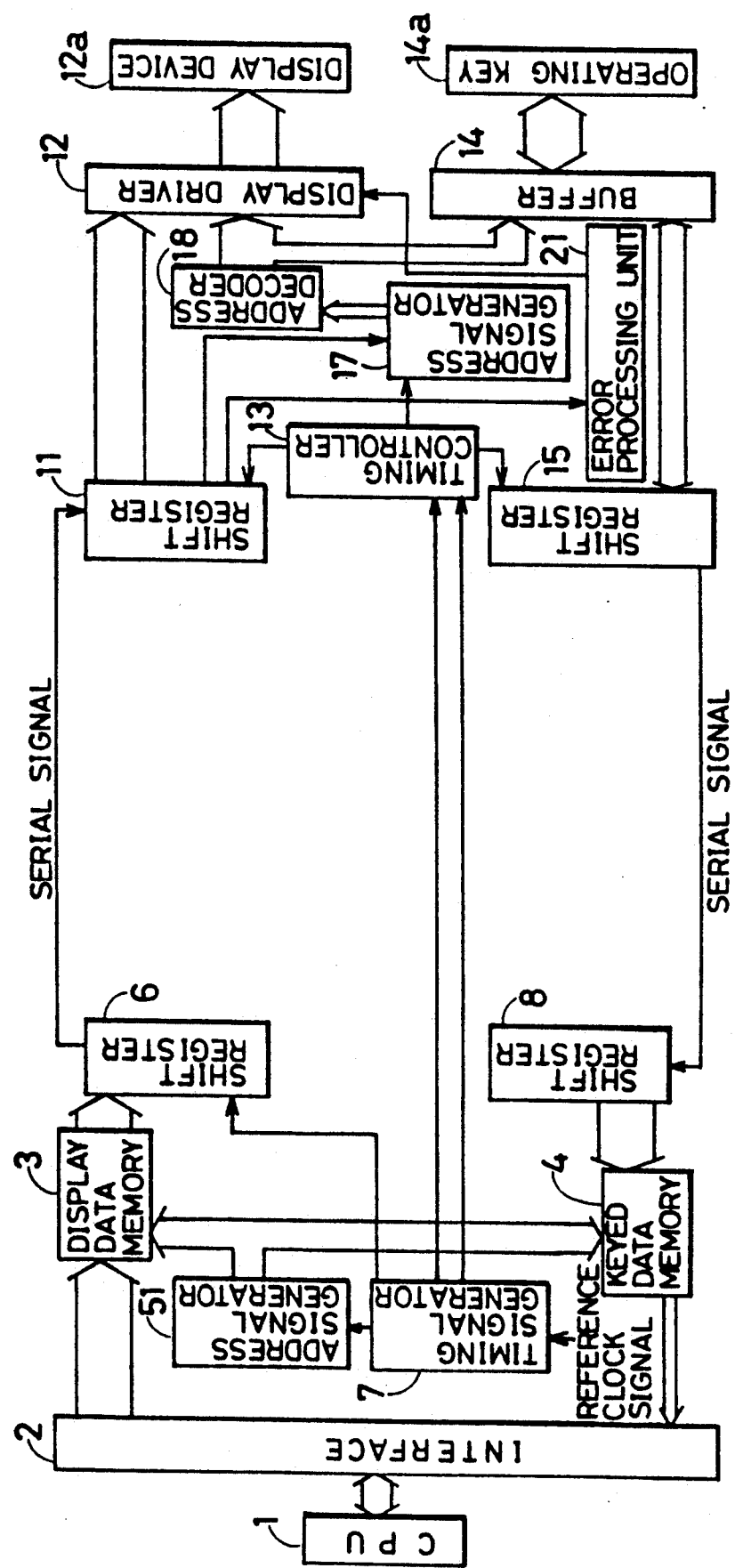
FIG. 4 is a block diagram showing an overall construction of a third signal communication system of the present invention.

A third signal communication system of the present invention will be described with reference to FIG. 4. The third signal communication system is provided with an address signal generator 51 for generating address signals to change the transmission sequence in which data signals are transmitted, for example, to change the transmission sequence in the unit of frame.

Also, an error processing unit 21 is provided in an operation portion. The error processing unit 21 discriminates based on display data from a shift register 11 whether the display data carries an error, and transmits a control signal to a display driver 12 to suspend the display, if carrying an error.

A specific construction of the address signal generator 51 will be described with reference to FIG. 6. The address signal generator 51 includes an address counter 510 and a gate circuit 511. The address counter 510 counts clock signals from a timing signal generator 7 and outputs a binary code of four bits from ports QA, QB, QC, and QD. The gate circuit 511 outputs an exclusive-OR of output from the least significant bit QA and output from the most significant bit QD as the least significant bit A0 of the address signal. Specifically, when the output from the most significant bit QD of the address counter 510 is "0", the gate circuit 511 outputs the output from the least significant bit QA of the address counter 510 as the least significant bit A0 of the address signal. On the other hand, when the output from the most significant bit QD is "1", the gate circuit 511 outputs the opposite value of the output from the least significant bit QA as the least significant bit A0 of the address signal. Also, the address counter 510 outputs a binary code of "0000" after a binary code of "1111". A relationship between outputs of the four bits of the address counter 510, address signals, and display data is shown in TABLE 1.

TABLE 1

| Output of Address Counter | | | | Address Signals A2 | A1 | A0 | Display Data |
|---|---|---|---|---|---|---|---|
| 0 | 0 | 0 | 0 | 0 | 0 | 0 | D0 |
| 0 | 0 | 0 | 1 | 0 | 0 | 1 | D1 |
| 0 | 0 | 1 | 0 | 0 | 1 | 0 | D2 |
| 0 | 0 | 1 | 1 | 0 | 1 | 1 | D3 |
| 0 | 1 | 0 | 0 | 1 | 0 | 0 | D4 |
| 0 | 1 | 0 | 1 | 1 | 0 | 1 | D5 |
| 0 | 1 | 1 | 0 | 1 | 1 | 0 | D6 |
| 0 | 1 | 1 | 1 | 1 | 1 | 1 | D7 |
| 1 | 0 | 0 | 0 | 0 | 0 | 1 | D1 |
| 1 | 0 | 0 | 1 | 0 | 0 | 0 | D0 |
| 1 | 0 | 1 | 0 | 0 | 1 | 1 | D3 |
| 1 | 0 | 1 | 1 | 0 | 1 | 0 | D2 |
| 1 | 1 | 0 | 0 | 1 | 0 | 1 | D5 |
| 1 | 1 | 0 | 1 | 1 | 0 | 0 | D4 |
| 1 | 1 | 1 | 0 | 1 | 1 | 1 | D7 |
| 1 | 1 | 1 | 1 | 1 | 1 | 0 | D6 |

Operations of the third signal communication system will be described with reference to FIGS. 6 to 8, and the above TABLE 1. The bits A0, A1, and A2 produce one frame of eight address signals, namely "000," "001," "010," "011," "100," "101," "110," and "111." Further, the eight address signals "000," "001," ... "111" correspond to display data D0, D1, ... D7 respectively.

Specifically, when the address counter 510 starts counting, the binary count code "0000" is first outputted. Since the most significant bit QD of the count code "0000" is "0," the gate circuit 511 outputs the least significant bit A0 of "0" and therefore the address signal "000" is transmitted to the display data memory 3. The display data D0 corresponding to the address signal "000" transmitted from the display data memory 3 to the shift register 6. The shift register 6 transmits the display data D0 to the shift register 11 in serial form. The shift register 11 restores the received serial display data signal D0 to the parallel display data D0 which is in turn transmitted to the display driver 12. The display driver 12 drives display elements corresponding to the address signal to execute dynamic display of the display data D0.

Subsequently, the address counter 510 outputs the count code "0001," and the gate circuit 511 outputs the least significant bit of "1", causing the address signal "001" which is then transmitted to the display data memory 3. The display data D1 corresponding to the address signal "001" is transmitted from the display data memory 3 to the shift register 6 and then to the shift register 11. Until the last address signal of "111" of the first frame is outputted, less significant bits QA, QB, and QC of the address counter 510 are transmitted to the display data memory 3 as address signals. More specifically, as shown in an upper half of TABLE 1 and a sequence A shown in FIG. 6, the display data are sequentially transmitted to the shift register 6 in the sequence of D0, D1, D2, D3, D4, D5, D6, and D7.

On the other hand, when address signals of the second frame are transmitted, the address counter 510 outputs the count code "1000." At this time, the most significant bit QD is "1". Accordingly, the least significant bit QA is outputted from the gate circuit 511 with being inverted. More specifically, in the case of the count code "1000", the least significant bit QA of "0" is inverted to "1" which is outputted as the least significant bit A0. Consequently, the address signal "001" is produced and transmitted to the display data memory 3 out of which the display data D1 is firstly transmitted in a different sequence from the first frame. Subsequently, the count code "1001" from the address counter 510 is outputted to the gate circuit 511. The gate circuit 511 in turn outputs the address signal "000" to the display data memory 3, out of which the display data D0 is transmitted to the shift register 6.

Thereafter, the address signals "011" and "010" are outputted in response to the count code "1010" and "1011" from the address counter 510 respectively. More specifically, in the second frame, the sequence of address signals is replaced every two counts by the address counter 510. Accordingly, as shown in a lower half of TABLE 1 and a sequence shown in FIG. 7, every two adjoining display data are replaced with each other and transmitted from the display data memory 3

When the count code returns to "0000" from "1111" to advance to the third frame, the sequence of address signals returns to the sequence corresponding to the same sequence A as the first frame. Consequently, the display data are transmitted from the display data memory 3 in the sequence of D0, D1, D2, D3, D4, D5, D6, and D7.

Figure 6:
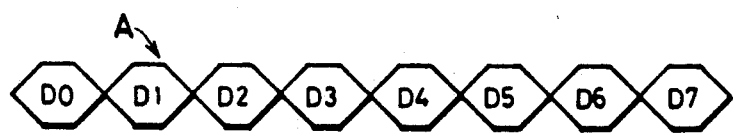
FIG. 6 is a diagram showing a data sequence in one frame of a serial display data signal generated in the third signal communication system.
Figure 7:
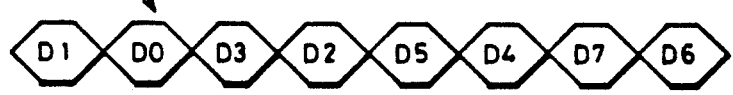
FIG. 7 is a diagram showing another data sequence in one frame of a serial display data signal generated in the third signal communication system.
Figure 8:
FIG. 8 is a diagram showing a serial display data signal sequence of the frame shown in FIG. 6 and the frame shown in FIG. 7.

Accordingly, as shown in FIG. 8, the display data are transmitted from the display data memory 3 in the sequence A shown in FIG. 6 and the sequence shown in FIG. 7, and alternately replaced every frame.

Figure 9:
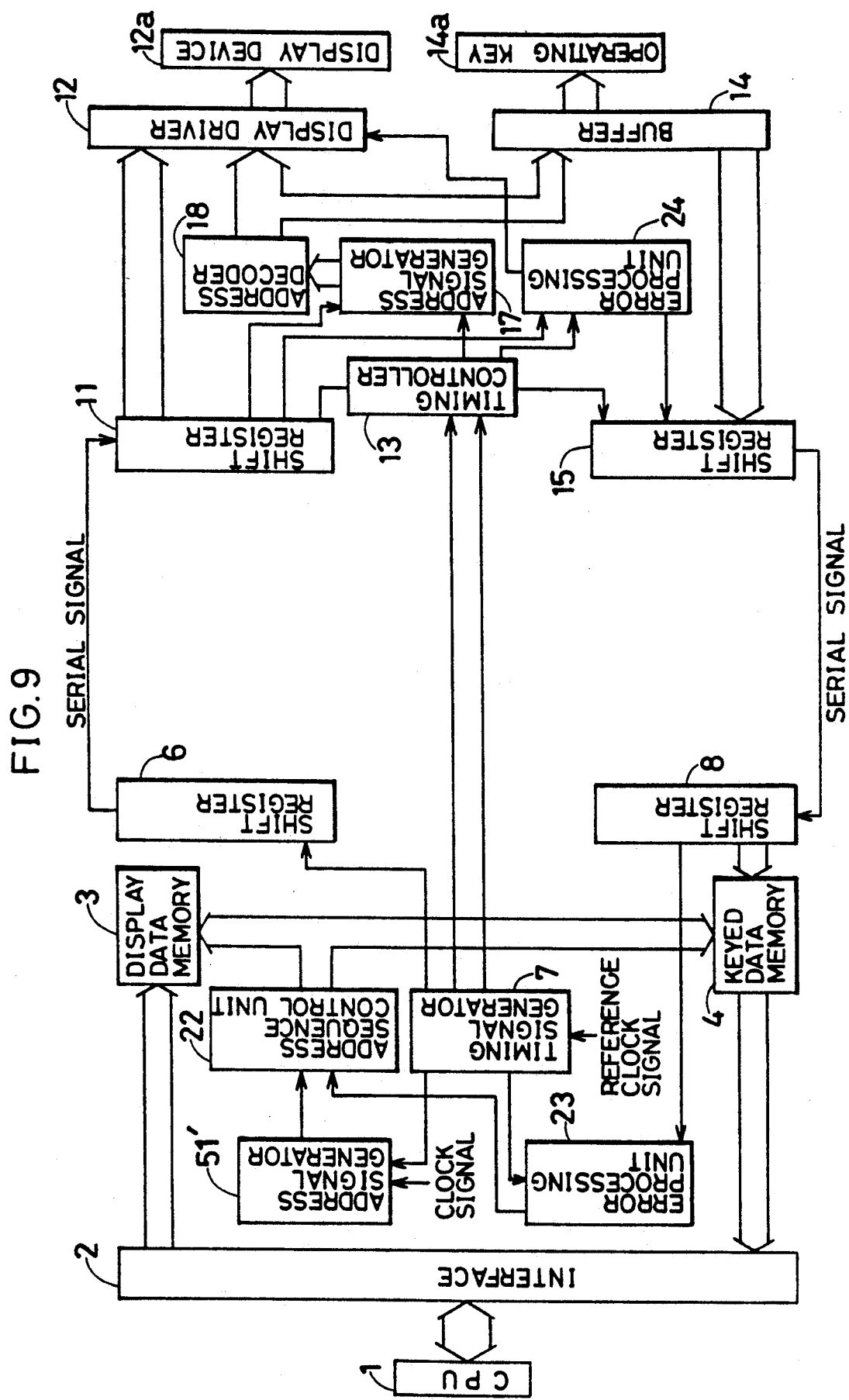
FIG. 9 is a block diagram showing an overall construction of a fourth signal communication system of the present invention.

A fourth signal communication system of the present invention will be described with reference to FIG. 9. Further, like numerals generally designate like parts. In the fourth embodiment, an address signal sequence control unit 22 and an error processing unit 23 are provided in a main control portion. An address signal generator 52 generates address signals in accordance with a clock signal and transmits the address signals to the address signal sequence control unit 22. The address signal sequence control unit 22 is adapted for changing the address signal sequence based on an error signal from the error processing unit 23. The error processing unit 23 is adapted for discriminating whether keyed data transmitted from an operation portion has an error information signal, and transmitting the error signal to the address signal sequence unit 22 when the keyed data has the error information signal.

The error information signal is added to the keyed data signal by an error processing unit 24 provided in the operation portion. The error processing unit 24 discriminates based on a signal from a shift register 11 whether an error has occured in receiving of the signal, and transmits the result of the discrimination to the shift register 15 as the error information signal. The shift register 15 transmits the error information signal together with the serial keyed data signal to the shift register 8. Also, the error processing unit 24 transmits a control signal to a display driver 12 to suspend the display of erroneous display data.

Figure 5:
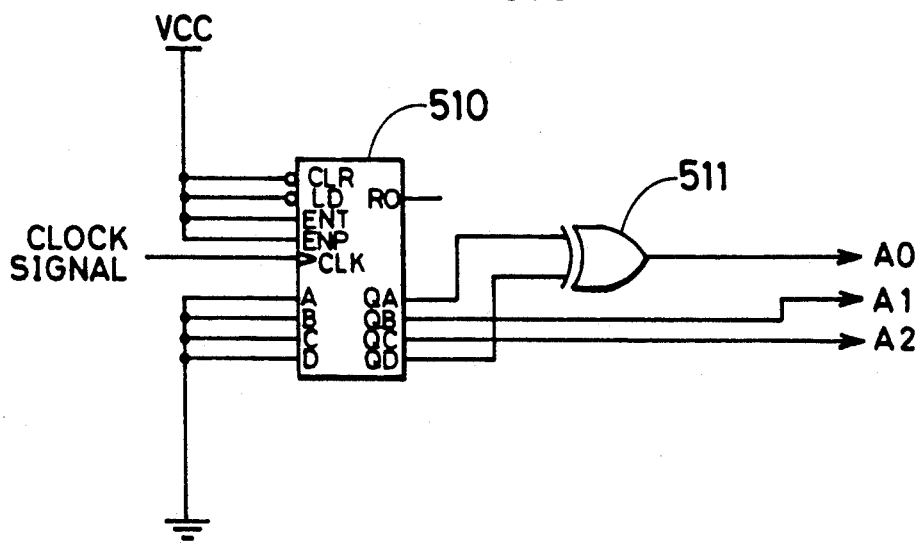
FIG. 5 is a diagram showing a circuit construction of an address signal generator used in the third signal communication system.
Figure 10:
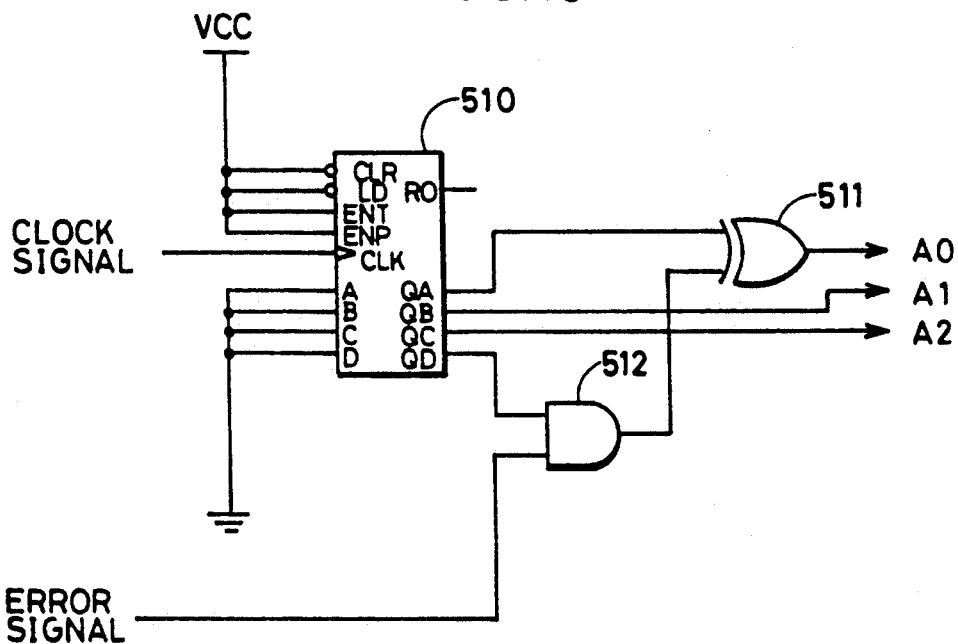
FIG. 10 is a diagram showing a circuit construction of an address signal generator and an address sequence control unit used in the fourth signal communication system.

A specific circuit construction of the address signal generator 52 and the address signal sequence control unit 22 will be described with reference to FIG. 10. Like numerals are generally designated to like parts in FIGS. 5 and 10.

In addition to an address counter 510 and a gate circuit 511, an AND circuit 512 is provided in the address signal generator 51'. The AND circuit 512 is adapted for ouputting the most significant bit QD from the address counter 510 to one of the output terminals of the gate circuit 511 while receiving the error signal from the error processing unit 23.

Next, operations of the fourth signal communication system will be described with reference to FIG. 11.

In the case where the display data is normally received by the shift register 11, an error signal indicative of absence of reception error (hereinafter referred to as an error absence signal) is transmitted to the error processing unit 23 from the error processing unit 24 via the shift register 15 and the shift register 8. Upon receiving the error absence signal, the error processing unit 23 transmits a low signal to the AND circuit 512. Accordingly, the AND circuit 512 transmits a low signal, i.e., "0" to the gate circuit 511 irrespective of the output of the most significant bit QD of the address counter 510. Upon reception of the low signal, the gate circuit 511 outputs the least significant bit as it is. More specifically, the address signals from the bits A0, A1, and A2 are outputted to the display data memory 3 in the sequence of "000," "001," . . . "111." Accordingly, the display data are sequentially transmitted from the display data memory 3 to the shift register 6 in the sequence of D0, D1, . . . D7 as shown in the sequence A of FIG. 6.

Figure 11:
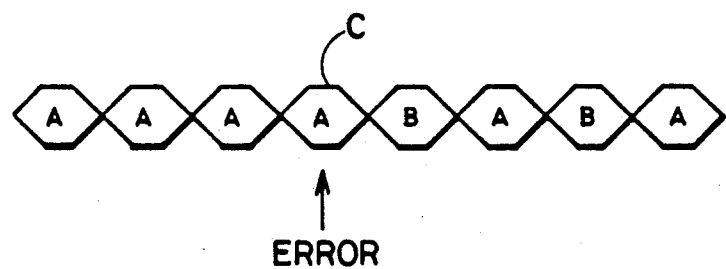
FIG. 11 is a diagram showing a serial display data signal sequence generated in the fourth signal communication system.

On the other hand, in the case where a date reception error has occured in the shift register 11, for example, as shown in FIG. 11, an error occurs when data of a frame C is being received, an error signal indicative of presence of reception error (hereinafter referred to as an error presence signal) is transmitted to the error processing unit 23 from the error processing unit 24 via the shift register 15 and the shift register 8. Upon receiving the error presence signal, the error processing unit 23 transmits a high signal, or error signal to the AND circuit 512. Accordingly, the AND circuit 512 outputs the most significant bit QD of the address counter 510 as it is to the gate circuit 511, which in turn changes the sequence of address signal every frame. More specifically, in the frames succeeding to the frame C, the sequence of display data transmitted from the display data memory 3 is alternately changed to the sequence A shown in FIG. 6 and the sequence B shown in FIG. 7 every frame in a similar manner as described with reference to FIG. 8.

Thereafter, when the data reception in the shift register 11 returns to the normal state, the error absence signal is transmitted to the error processing unit 23. Upon receiving error absence signal, the error processing unit 23 resumes transmitting the low signal instead of the high signal, and thereby the address signal are transmitted to the display data memory 3 in the sequence of "000," "001," . . . "111" again. In other words, the display data D0, D1, . . . D7 are sequentially transmitted from the display data memory 3 to the shift register 6 in the sequence A.

Further, it may be appropriate that the sequence of display data be changed every frame for a predetermined period of time after reception of the error presence signal in the main control portion in the fourth embodiment.

Moreover, determination as to whether a data reception error has occurred in the shift register 11 is not limited to the determination way as described above. For example, it may be appropriate that a parity bit be added to the display data signal to be transmitted so that the presence of error be checked in accordance with the parity bit. It may also be appropriate that a predetermined data for error detection be added to the display data signal to be transmitted so that the presence of error be determined depending on whether the added error detection data corresponds to error detection data already stored in the operation portion. Further, it should be noted that the address signal sequence control unit of the fourth embodiment may be applicable for parallel signal transmission systems.

Furthermore, the sequence A and the sequence B are not limited to the address signal sequences as shown in FIGS. 6 and 7. It should be appreciated that other address signal sequences are substitutable as far as the address signal sequences are changed every frame. Also, the transmission sequence of frame is not limited to the one shown in FIG. 8. For example, the transmission sequence of frame may be A, A, B, . . . ,A, A, B. Further, although two adjoining display data are replaced with each other in the fourth embodiment, it may be appropriate that, for example, three adjoining display data are replaced with one another. In this case, another address signal sequence may be provided in addition to the sequences A and B.

Figure 12:
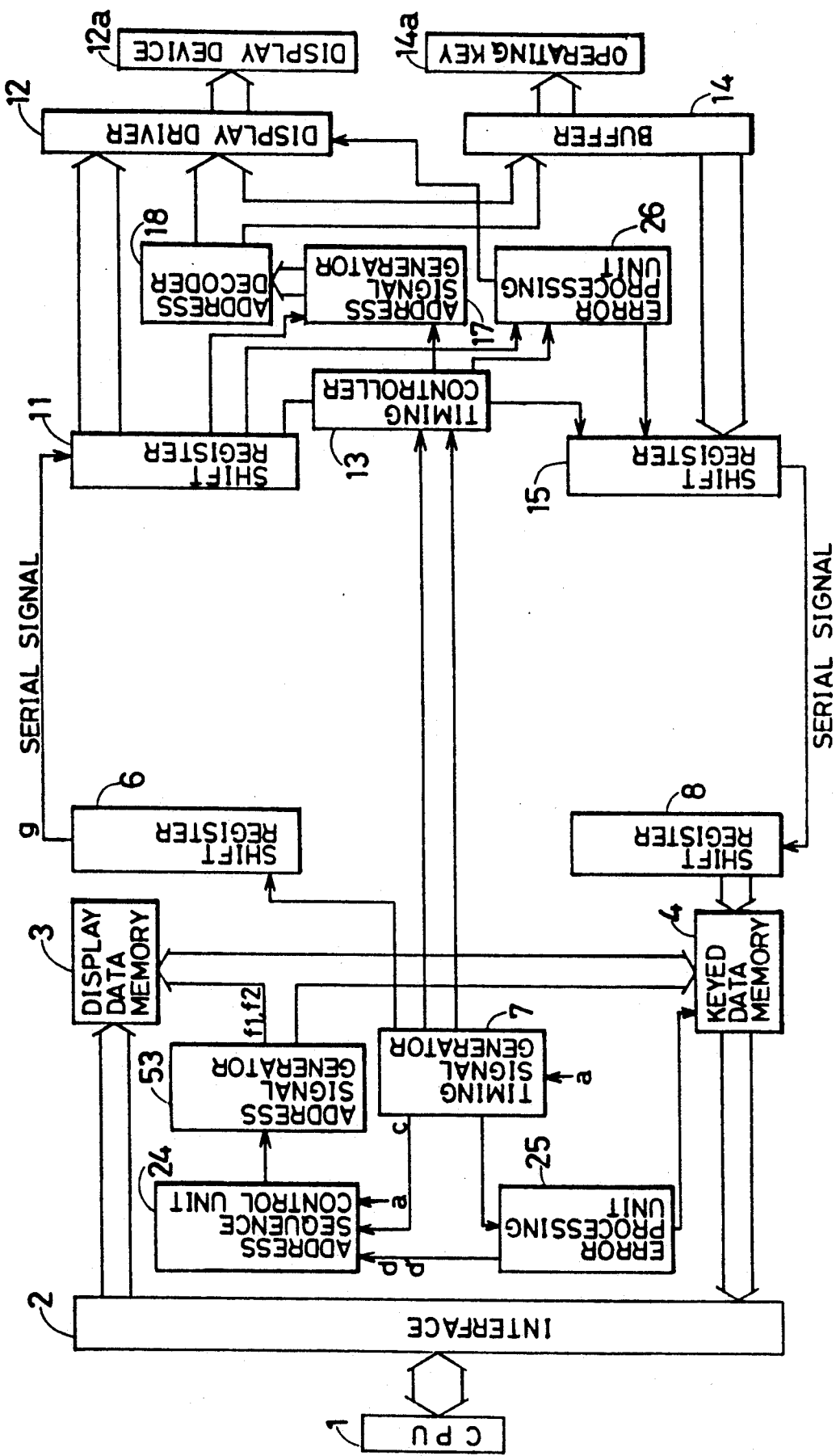
FIG. 12 is a block diagram showing an overall construction of a fifth signal communication system of the present invention.

A fifth signal communication system of the present invention will be described with reference to FIG. 12. Further, like numberals generally designate like parts in FIG. 9 and FIG. 12. In the fifth embodiment, an address signal sequence control unit 24 and an error precessing unit 25 are provided in a main control portion. An address signal generator 53 generates address signals to be transmitted to a display data memory 3. Also, the address signal generator 53 stores the address corresponding to previously transmitted display data. The address signal sequence control unit 24 is adapted for changing the address signal sequence based on an error signal from the error processing unit 25. The error processing unit 26 is adapted for discriminating whether keyed data transmitted from an operation portion has an error information signal, and transmitting the error signal to the address signal sequence control unit 24 when the keyed data has the error information signal.

The error information signal is added to the keyed data signal by an error processing unit 26 provided in the operation portion. The error processing unit 26 executes discrimination as to whether an error has occured in the signal reception of the shift register 11. This discrimination is executed every one frame (e g , 24 bits) of display data signal. When detecting the occurence of an error, &he error processing unit 26 transmits the error information signal to the shift register 15. The shift register 15 transmits the error information signal together with the serial keyed data signal to the shift register 8. Also, the error processing unit 26 transmits a control signal to a display driver 12 &o suspend the display of the display data.

Further, the error processing unit 25 executes discrimination as to whether an error has occured in &he signal reception of the shift register 8. This discrimination is executed every one frame (e.g., 24 bits) of keyed data signal. When detecting the occurence of an error, the error processing unit 25 transmits a control signal to a keyed data memory 4 to suspend the storing of the erroneous keyed data.

Figure 13:
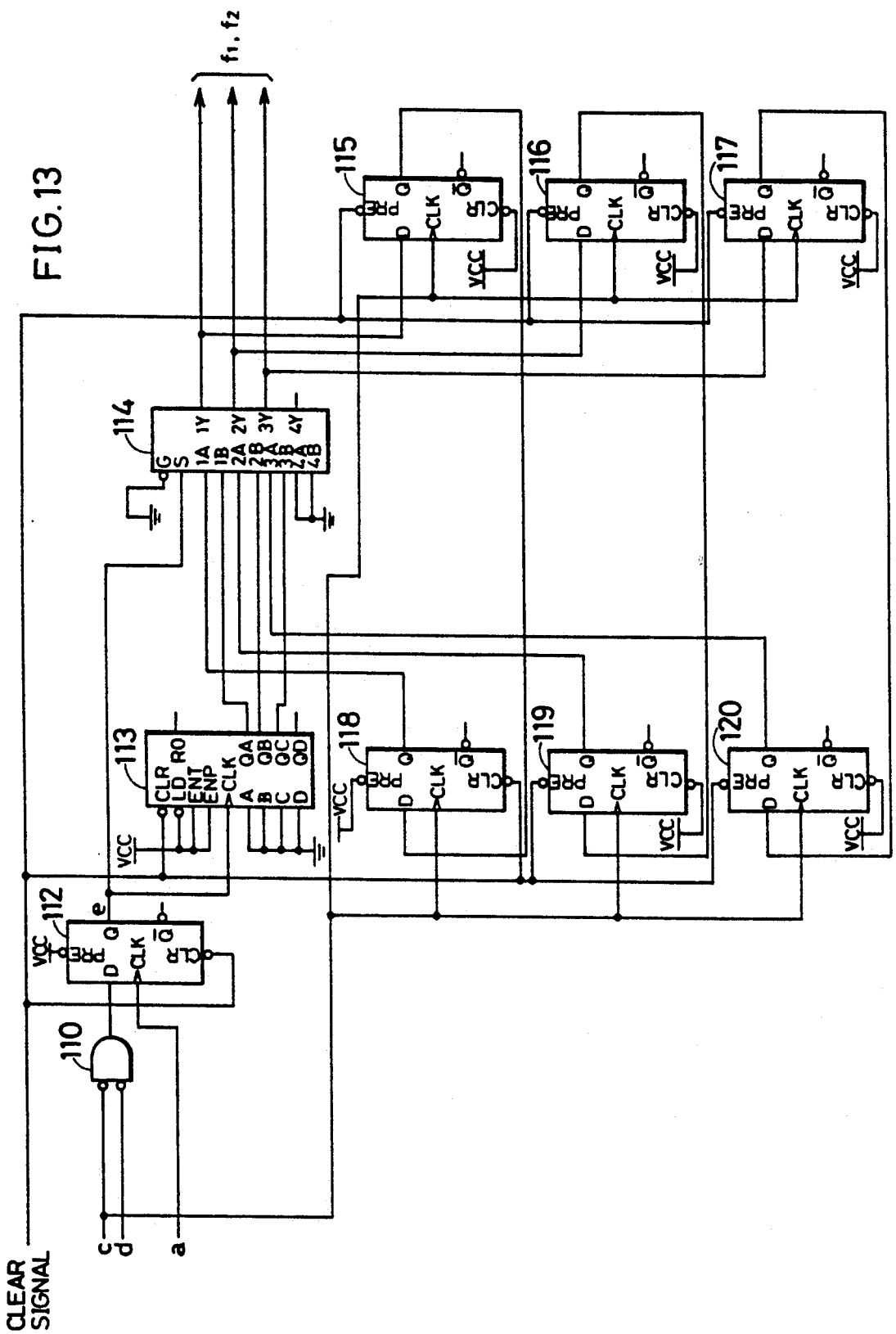
FIG. 13 is a diagram showing a circuit construction of an address signal generator and an address sequence control unit used in the fifth signal communication system.

A specific circuit construction of the address signal generator 53 and the address signal sequence control unit 24 will be described with reference to FIG. 13. The address signal generator 53 and the address signal sequence control unit 24 include an AND circuit 110, an address counter 113, an address selector 114, and D flip-flops 112, 115 to 120.

The AND circuit 110 receives a timing signal c from the timing signal generator 7 and an error signal d from the error processing portion 25 and transmits an output determined by the signals c and d to the D flip-flop 112. The D flip-flop 112 transmits the output of the AND circuit 110 to the address counter 113 and the address selector 114 in synchronization with a clock signal a.

The address counter 113 counts output pulses e of the D flip-flop 112 and transmits an address signal of three bits to input ports 1B, 2B, and 3B of the address selector 114. The address selector 114 transmits the address signal from the address counter 113 to the display data memory 3 and the keyed data memory 4 when the output pulse e from the D flip-flop 112 is high. On the other hand, when the output pulse e from the D flip-flop 112 is low, the address selector 114 transmits the address signals to the display data memory 3 and the keyed data memory 4 from the D flip-flops 118, 119, and 120.

The D flip-flops 115, 116, 117 receive the address element signals from output ports 1Y, 2Y, and 3Y of the address selector 114. After holding the address signal for the period of one cycle of the timing signal c, the D flip-flops 115, 116, 117 transmit the address element signals to the D flip-flops 118, 119, 120. After holding the address element signals from the D flip-flops 115, 116, 117 for the period of one cycle of the timing signal c, the D flip-flops 118, 119, 120 transmit the address element signals to input ports 1A, 1B, and 1C of the address selector 114. In other words, the D flip-flops 118, 119, 120 transmit the previous address signal to the address selector 114.

Operations of the address signal generator 53 and the address signal sequence control unit 24 will be described with reference to FIGS. 14 and 15. In this embodiment, data for each address is made of 24 bits, i.e., B0 to B23.

Figure 15:
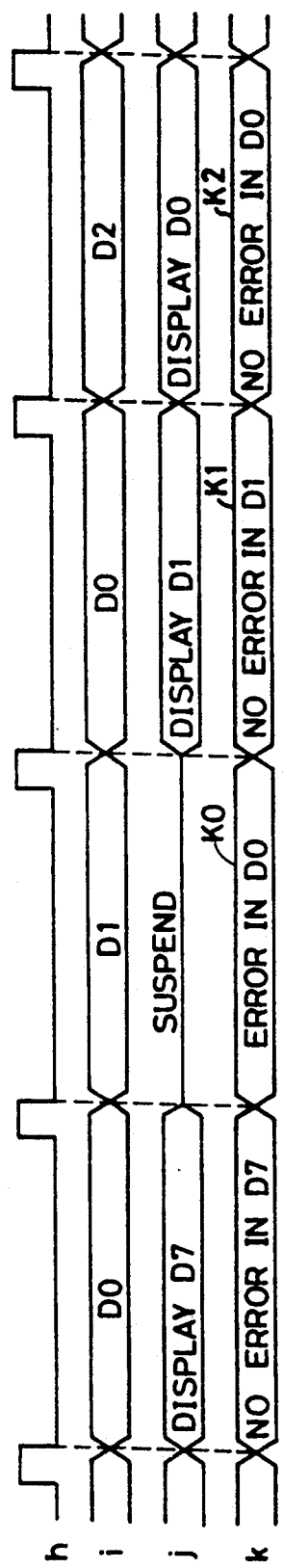
FIG. 15 is a diagram showing a relationship between an address signal, display of display data, and error signal used in the fifth signal communication system.

As shown in FIG. 15, in the case that display data D0 for address A0 is transmitted to the shift register 11, the shift register 15 transmits keyed data K0 carrying error information data concerning the reception of the display data D0 to the shift register 8 during the time when the shift register 11 receives display data D1.

When the keyed data K0 received by the shift register 8 does not have error presence information data, the shift register 6 transmits display data D2 for address A2 following the transmission of the display data D1. On the o&her hand, if error presence information data is included in the keyed data K0, the shift register 6 transmits the display data D0 for address A0 again after transmitting the display data D1, and then transmits the display data D2 for address A2 following the transmission of the display data D1.

More specifically, when the shift register 11 receives the display data D0 for address A0 without any error, the display data D1 for address A1 is transmitted to the shift register 6, and to the shift register 11 by time t1. At the same time, the keyed data K0 for the previous address A0 is received by the shift register 8. The error processing unit 25 discriminates based on the error information data carried by the keyed data K0 whether an error has occured in the reception of the display data D0. In the case of FIGS. 14 and 15, no error has occured. Accordingly, at the time t1, the error signal d transmitted from the error processing unit 25 is low. Consequently, the AND circuit 110 transmits the high output to the D flip-flop 112 at the time ti when the timing signal c becomes low. The D flip-flop 112 transmits a pulse E1 to the address counter 113 at time t2 when the clock signal a rises.

The address counter 113 counts the pulse E1 and then allows the address to be advanced from address A1 to address A2. Simultaneously, the pulse E1 is transmitted to the address selector 114, and the input ports 1B, 2B, 3B are then connected with output ports 1Y, 2Y, 3Y respectively. Consequently, the address signal F1, i.e., address 2, from the address counter 113 is changed to address 0 which is transmitted to the display data memory 3 by way of output ports 1Y, 2Y, 3Y. Display data D2 for address A2 is transmitted from the display data memory 3 to the shift register 6, and transmitted to the shift register 11 in serial form g. The transmission of the serial signal g is started at time t3 when the timing signal c becomes high during the pulse E1, or a frame signal h becomes low. Also, the serial signal g is sequentially transmitted from bit B0 to bit B23 in synchronization with the clock signal b.

At time t4, the output e of the D flip-flop 112 becomes low. Accordingly, the address selector 114 connects the input ports 1A, 2A, 3A with the output ports 1Y, 2Y, 3Y, and the D flip-flops 118, 119, 120 transmit the previous address, i.e., address A1, to the address selector 114, and to the keyed data memory 4, so that the keyed data K1 for address A1 is stored in the keyed data memory 4.

In other words, when the shift register 11 receives display data without any error, the address selector 114 transmits once-advanced address to the keyed data memory 4 every time the timing signal c becomes low.

Figure 14:
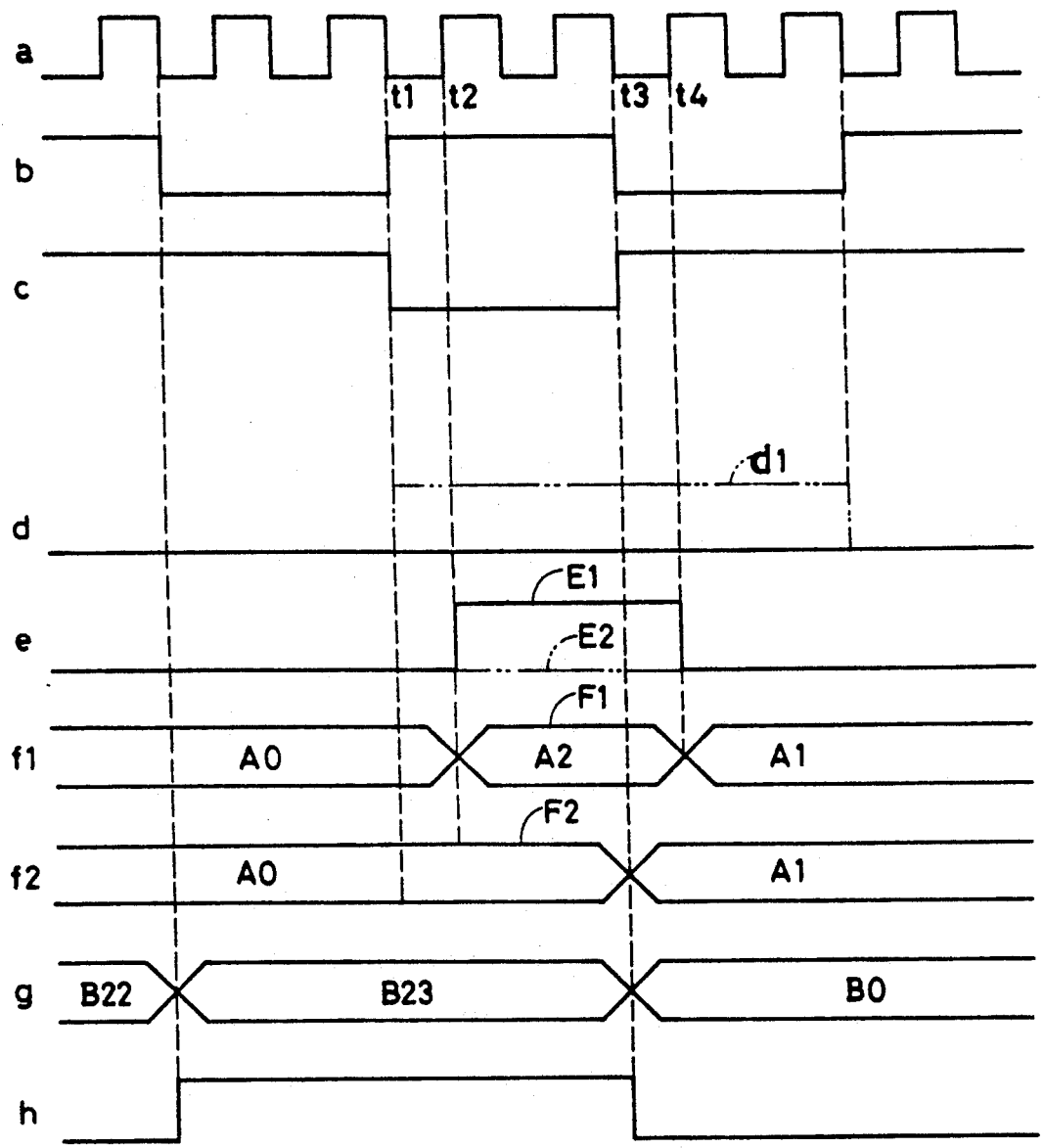
FIG. 14 is a diagram showing a relationship between signals generated in the fifth signal communication system.

To the contrary, when an error has occured in the reception of display data, for example, when the display data D0 for address A0 is erroneously received by the shift register 11, the error signal d from the error processing unit 25 becomes high as shown by phantom lines d1 in FIG. 14. The AND circuit 110 transmits the low output to the D flip-flop 112 at the time t1 when the timing signal c becomes high. The D flip-flop 112 transmits a pulse E2 to the address counter 113 at time t2 when the clock signal a rises. The pulse E2, shown by a phantom line, is held in the low state from the time t2 to the time t4.

Consequently, the address selector 114 connects the input ports 1A, 2A, 3A with the output ports 1Y, 2Y, 3Y, and &he D flip-flops 118, 119, 120 transmits the previous address F2, i.e., address A0, to the address selector 114 which in turn transmits the previous address F2 to the display data memory 3 from the output ports 1Y, 2Y, 3Y thereof. The display data D0 for address A0 is transmitted from the display data memory 3 to the shift register 6, and transmitted to the shift register 11 in serial form g.

When receiving the error presence information signal, the error processing unit 25 transmits a control signal to the keyed data memory 4 to suspend the storing of &he keyed data. Also, the error processing unit 26 provided in the operation portion transmits a control signal to a display driver 12 to suspend the display of the display data D0.

As descirbed above, if an error has occured in the reception of display data, the display data involving the reception error is again transmitted to the shift register 11 of the operation portion. It is usual that there is little possibility that two bits or more of 24 bits are damaged in one transmission. Also, the error information data signal is defined by one bit. Accordingly, there is little possibility that the error information data is damaged in one transmission. In other words, the discrimination of error is reliable which is executed based on the error information signal transmitted from the operation portion.

It may be appropriate that a parity bit is added to display data transmitted to the shift register 11 of the operation portion to detect reception error. Also, it may be appropriate that error detection data is added to display data transmitted to the shift register 11 of the operation portion to enable reception error to be detected by collating the added error detection data with already stored error detection data. Further, this embodiment may be applicable for parallel signal transmissions.

Also, a unit for transmitting an error information signal indicative of the presence of keyed data reception error may be provided in the main control portion to add the error information signal to display data so that the discrimination of keyed data reception error can be executed in the operation portion, and the keyed data involving a reception error is again transmitted to the main control portion, if the error has occured.

Figure 16:
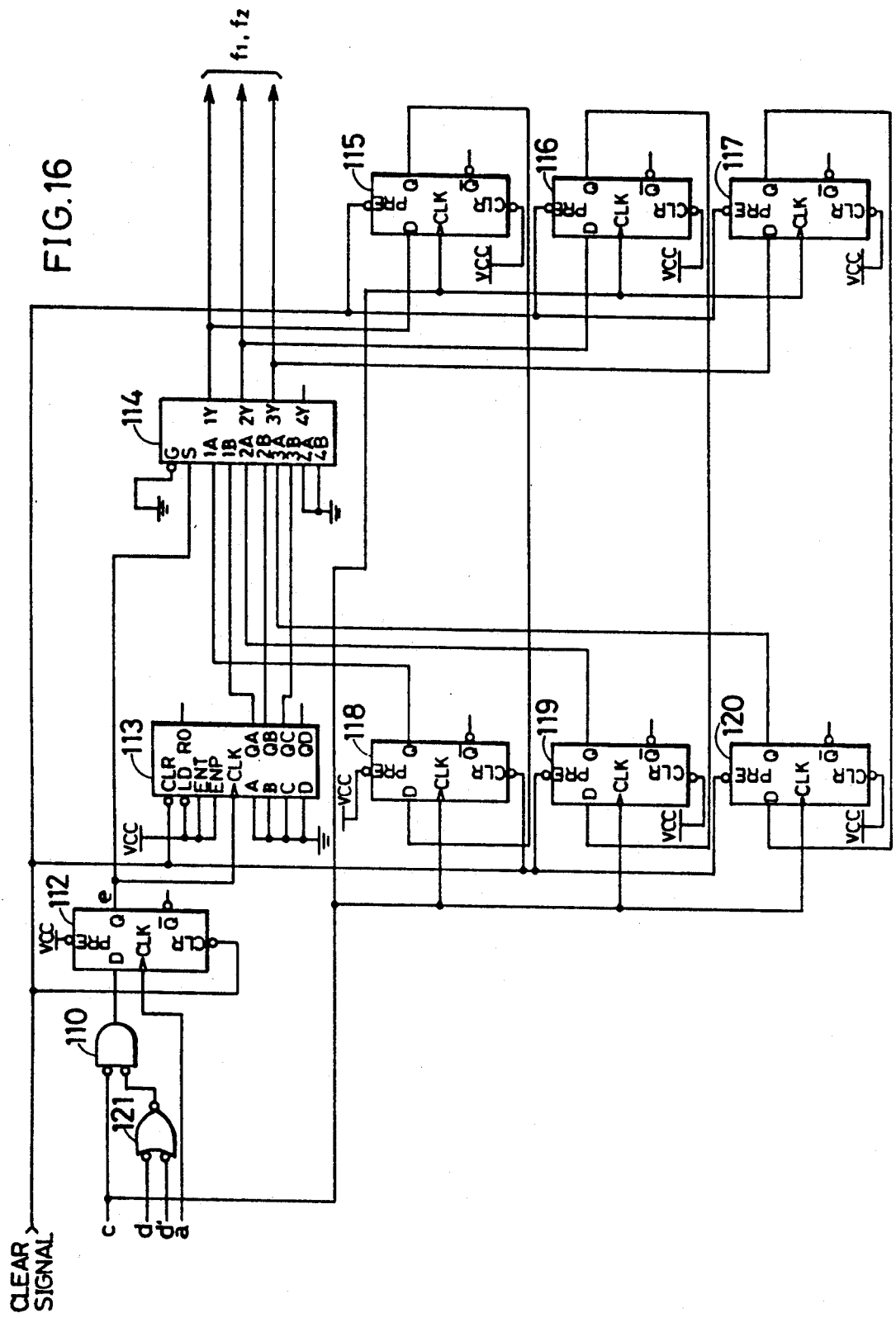
FIG. 16 is a diagram showing another circuit construction of an address signal generator and an address sequence control unit used in the fifth signal communication system.

Another circuit construction of the address signal generator 53 and the address signal sequence control unit 24 will be described with reference to FIG. 16. Like numerals are designated to like parts in FIG. 13 and FIG. 16. In this circuit, an OR circuit 121 is additionally provided. The OR circuit 121, an AND circuit 110, and a D flip-flop 112 constitute a circuitry for discriminating as to whether a reception error has occured in the main control portion and the operation portion. Specifically, the OR circuit 121 receives an error signal d indicating that reception error has occured in the shift register 8 of the main control portion, or an error signal d' indicating that reception error has occured in the shift register 11 of the operation portion, and transmits an output defined by the error signal d or the error signal d' to one input port of the AND circuit 110. The AND circuit 110 receives a timing signal c from the timing signal generator 7 and the error signal d or d' from the error processing portion 25 and transmits an output determined by the signals c and d or d' to the D flip-flop 112. Subsequently, operations are executed which are similar to the circuit shown in FIG. 13.

The operations of the address signal generator 53 and the address signal sequence control unit 24 including the circuit of FIG. 16 will be described with reference to FIG. 17.

When the shift register 11 receives display data D0 for address A0 without any error and the shift register 8 also receives keyed data without any error, the display data D1 for address A1 is transmitted to the shift register 6, and to the shift register 11 by time t'1. At the same time, as shown in FIG. 15, the keyed data K0 for the previous address A0 is received by the shift register 8 without receiving the error presence signal. At the time t'1, the error signal d transmitted from the error processing unit 25 is high, and the error signal d' is low. Accordingly, the OR circuit 121 transmits the low output to the AND circuit 110 which in turn transmits the high output to the D flip-flop 112 at the time t'1 when the timing signal c becomes low. The D flip-flop 112 transmits a pulse E1 to the address counter 113 at time t'2 when the clock signal a rises.

The address counter 113 counts the pulse E1 and then allows the address to be advanced from address A1 to address A2. Simultaneously, the pulse E1 is transmitted to the address selector 114, and the input ports 1B, 2B, 3B are then connected with output ports 1Y, 2Y, 3Y respectively. Consequently, the address signal F1, i.e., address 2, from the address counter 113 is changed to address 0 which is transmitted to the display data memory 3 by way of output ports 1Y, 2Y. 3Y. Display data D2 for address A2 is transmitted from the display data memory 3 to the shift register 6, and transmitted to the shift register 11 in serial form g. The transmission of the serial signal g is started at time t'3 when the timing signal c becomes high during the pulse E1, or a frame signal h becomes low. Also, the serial signal g is sequentially transmit&ed from bit B0 to bit B23 in synchronization with the clock signal b.

At time t'4, the output e of the D flip-flop 112 becomes low. Accordingly, the address selector 114 connects the input ports 1A, 2A, 3A with the output ports 1Y, 2Y, 3Y, and the D flip-flops 118, 119, 120 transmit the previous address, i.e., address A1, to the address selector 114, and to the keyed data memory 4, so that the keyed data K1 for address A1 is stored in the keyed data memory 4.

In other words, when the shift register 11 receives display data without any error, the address selector 114 transmits one-advanced address to the keyed data memory 4 every time the timing signal c becomes low.

Figure 17:
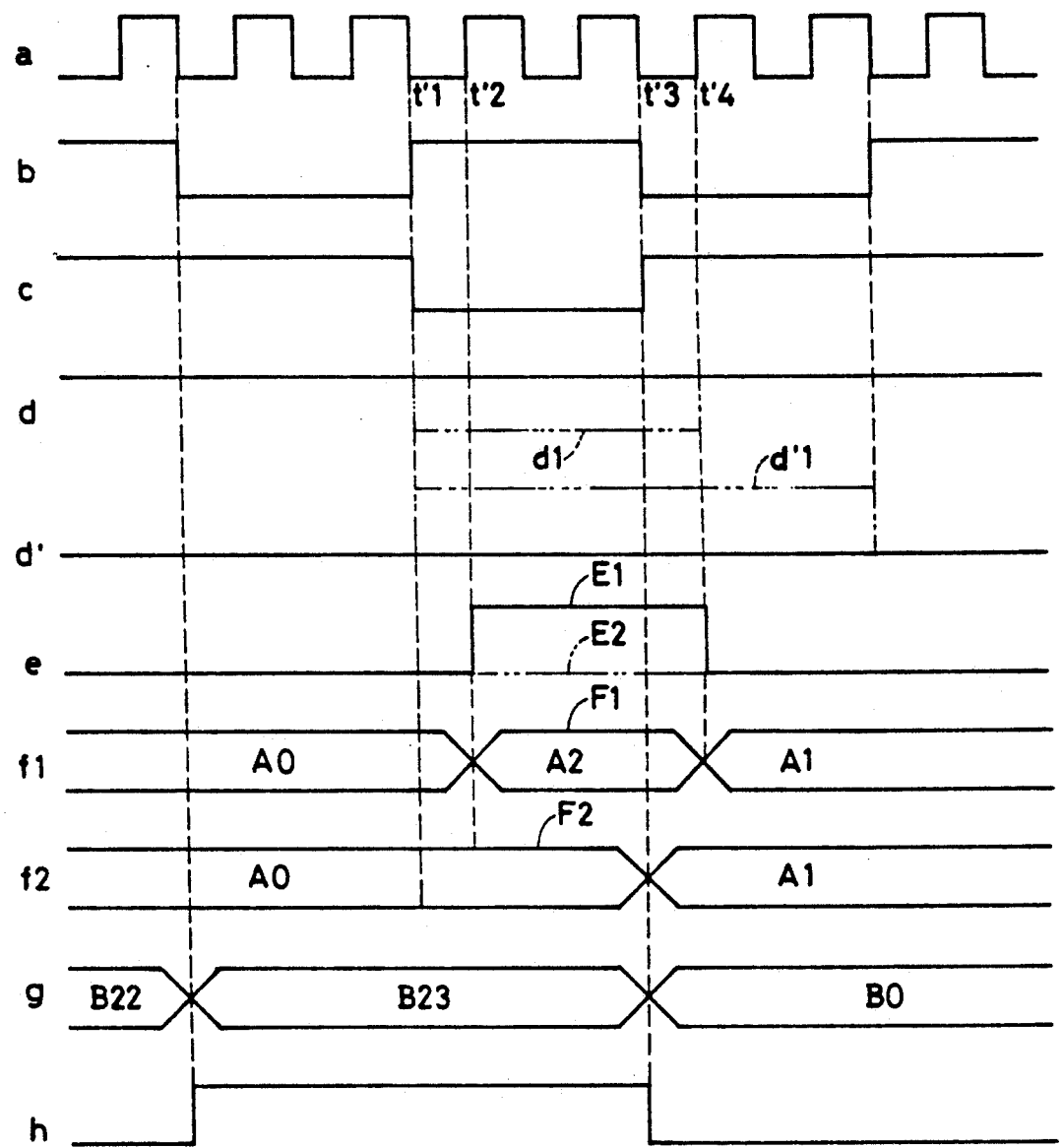
FIG. 17 is a diagram showing a relationship between signals generated in the another circuit of FIG. 16.

To the contrary, when an error has occured in the reception of the display data D0 for address A0, and the shift register 8 receives keyed data without any error, only the error signal d' from the error processing unit 25 becomes high as shown by phantom lines d'1 in FIG. 17. Accordingly, the OR circuit 121 transmits the high output &o the AND circuit 110 which in turn transmits the low output to the D flip-flop 112. The output pulse of the D flip-flop 112, as E2 shown by a phantom line, is held in the low state from the time t'2 to the time t'4.

Consequently, the address selector 114 connects the input ports 1A, 2A, 3A with the output ports 1Y, 2Y, 3Y, and the D flip-flops 118, 119, 120 transmit the previous address F2, i.e., address A0, to the address selector 114 which in turn transmits the previous address F2 to the display data memory 3 from the output ports 1Y, 2Y, 3Y thereof. The display data D0 for address A0 is transmitted from the display data memory 3 to the shift register 6, and transmitted to the shift register 11 in serial form g.

In the operation portion, the display of errorneous display data D0 is suspended by the control signal from the error processing unit 26.

Also, when an error has occured in the reception of keyed data, and the shift register 11 receives the display data without error, only the error signal d from the error processing unit 25 becomes low as shown by phantom lines d1 in FIG. 17. Accordingly, without connection with the error signal d', the OR circuit 121 transmits the low output to the AND circuit 110. Consequently, in the same manner as &he case when both shift reigsters 8 and 11 receives transmission signals without any error, the address counter 113 allows the address to be advanced one. The advanced address signal is transmitted to the display data memory 3. Accordingly, serial signals g are sequentially transmitted to the shift register 11 in the sequence of addresses.

As mentined above, in the case where reception error has occured in the main control portion, the address is advanced. Accordingly, the problem can be assuredly prevented that the transmission of display data is influenced by reception error in the shift register 8. Specifically, the transmission of the same display data is again executed due to the reception error in the shift register 8.

It may be appropriate that a parity bit is added to transmission data to detect reception error. Also, it may be appropriate that error detection data is added to transmission data to enable reception error to be detected by collating the added error detection data with already stored error detection data. Further, this embodiment may be applicable for parallel signal transmissions.

Also, as mentioned above, since there is a fixed relationship between the address and the transmission data, the address is used for the re-transmission. However, it may be appropriate to use transmission data itself for the re-transmission.

Although the present invention has been described with reference to dynamic display signal communication system for use in a copying machine, it will be apparent that the present invention may be applicable for signal communication of other apparatus.

Although the present invention has been fully described by way of example with reference to the accompanying drawings, it is to be understood that various changes and modifications will be apparent to those skilled in the art. Therefore, unless otherwise such change and modifications depart from the scope of the invention, they should be construed as being included therein.

What is claimed is:

1. A control device for controlling a plurality of operable elements, comprising a control portion and an operation portion;

the control portion comprising:

timing signal generator means for generating a timing signal at a specified time:

memory means for storing a plurality of control data, the plurality of control data corresponding to the plurality of operable elements respectively, each control data having address data for designating one of the plurality of operable elements and operation data for specifying an operation to be executed by the designated operable element;

control data transmitter means responsive to the timing signal generator means for transmitting one of the plurality of control data in a serial form in synchronism with the timing signal;

the operation portion comprising:

control data receiver means for receiving the serial control data;

converter means for converting the serial control data into a designating signal and an operation signal; and signal feeder means responsive to the timing signal generator means and the converter means for feeding the operation signal to the designated operable element in synchronism with the timing signal so as to control the designated operable element to operate in synchronism with the timing signal;

the control data transmitter means comprising sequential transmitter means for transmitting all of said plurality of control data in a predetermined sequence;

the control data transmitter means further comprising changer means for changing the transmission sequence of the plurality of control data;

the control data transmitter means still further comprising data adder means for adding error detection data to each of the plurality of control data;

the control data receiver means further comprising error detector means for detecting the presence of error in the control data transmission based on the error detection data, and error notifying means for notifying the presence of error to the changer means of the control data transmitter means;

the changer means comprising means for changing the transmission sequence of control data in response to notification thereof of the presence of an error, the changer means further comprising means for changing the transmission sequence so that the erroneously transmitted control data is transmitted prior to the remaining control data to be transmitted in the predetermined sequence.

2. A control device for controlling a plurality of operable elements, comprising a control portion and an operation portion;

the control portion comprising:

timing signal generator means for generating a timing signal at a specified time:

memory means for storing a plurality of control data, the plurality of control data corresponding to the plurality of operable elements respectively, each control data having address data for designating one of the plurality of operable elements and operation data for specifying an operation to be executed by the designated operable element;

control data transmitter means responsive to the timing signal generator means for transmitting one of the plurality of control data in a serial form in synchronism with the timing signal;

the operation portion comprising:

control data receiver means for receiving the serial control data;

converter means for converting the serial control data into a designating signal and an operation signal; and signal feeder means responsive to the timing signal generator means and the converter means for feeding the operation signal to the designated operable element in synchronism with the timing signal so as to control the designated operable element to operate in synchronism with the timing signal;

said operation portion being controlled by serial control data received thereby without a CPU.

3. A control device for controlling a plurality of operable elements, comprising a control portion and an operation portion;

the control portion comprising:

timing signal generator means for generating a timing signal at a specified time:

memory means for storing a plurality of control data, the plurality of control data corresponding to the plurality of operable elements respectively, each control data having address data for designating one of the plurality of operable elements and operation data for specifying an operation to be executed by the designated operable element;

control data transmitter means responsive to the timing signal generator means for transmitting one of the plurality of control data in a serial form in synchronism with the timing signal;

the operation portion comprising:

control data receiver means for receiving the serial control data;

converter means for converting the serial control data into a designating signal and an operation signal; and signal feeder means responsive to the timing signal generator means and the converter means for feeding the operation signal to the designated operable element in synchronism with the timing signal so as to control the designated operable element to operate in synchronism with the timing signal;

said receiver means comprising a shift register for receiving the output of said transmitter means, and said converter means comprising means for receiving an output from a predetermined stage of said shift register.

4. The control device according to claim 3 comprising a display device, said operable elements comprising elements of said display device, means for applying outputs of stages of said shift register, other than said predetermined stage, to said display device, and said feeding means comprises means responsive to said output of said predetermined stage for selectively designating said operable elements.

5. A control device for controlling a plurality of operable elements, comprising a control portion and an operation portion;

said control portion comprising:

a timing signal generator for generating a timing signal;

a memory connected to store a plurality of control data, separate control data of said plurality of control data corresponding to respective separate operable elements, each control data including address data for designating the respective operable element and operation data for specifying an operation to be executed by the designated operable element;

means for transmitting said timing signal to said operation portion, and means responsive to said timing signal for transmitting one of the plurality of control data to said operation portion in a serial form in synchronism with the timing signal;

said operation portion comprising:

means connected to receive said transmitted control data;

means connected to receive said timing signal;

means connected to said receiving means for separating the serial control data received thereby into a designating signal and an operation signal; and a signal feeder connected to direct said operation signal separated by said separating means to the respective operable element in response to said timing signal and said designating signal, in synchronism with the timing signal, so as to control the respective operable element to operate in synchronism with the timing signal;

said means for receiving said control data comprising a shift register, and means coupling said shift register to serially receive the output of said means for transmitting control data, said means for separating the serial control data received thereby comprising means for deriving said designating signal and said operation signal from different predetermined stages of said shift register.

* * * * *